United States Patent Office 3,265,663
Patented August 9, 1966

3,265,663
POLYMERIC CONDENSATION PRODUCTS OF HALOMETHYLATED DIPHENYL ETHERS AND AMINES AND PROCESS FOR MAKING SAME
William G. Lloyd, Bay City, Mich., assignor to The Dow Chemical Company, Midland, Mich., a corporation of Delaware
No Drawing. Filed Sept. 13, 1962, Ser. No. 223,556
16 Claims. (Cl. 260—47)

This invention relates to thermoplastic reaction products containing quaternary ammonium groups and more particularly, to substantially linear condensation polymers of halomethylated diphenyl ethers and amines. It pertains especially to the reaction of chemically equivalent amounts of (1) at least one halomethylated diphenyl ether containing not more than 4 halomethyl radicals selected from the group consisting of chloromethyl and bromomethyl radicals, said diphenyl ether having an average halomethyl group functionality of from 1.5 up to 2.5 halomethyl groups per diphenyl ether nucleus, and (2) an amine selected from the group consisting of (a) secondary amines having the formula:

and (b) ditertiary amines having the formula:

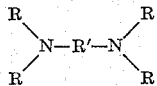

wherein each R is individually selected from the group consisting of phenyl, alkyl radicals having from 1 to 10 carbon atoms, hydroxyalkyl radicals having from 2 to 6 carbon atoms, and cyclic alkyl radicals having from 5 to 6 carbon atoms and wherein R and R taken together with the nitrogen atom form a ring containing 4 to 5 carbon atoms; and wherein R' is an organic divalent radical selected from the group consisting of polymethylene and phenylene which radical may be substituted or not by groups which do not interfere with the polymer-forming reaction, such as ether, sulfide, ketone, nitro, amide, hydroxyl, thiol, and the like.

The halomethylated diphenyl ether employed in the invention can be prepared by halomethylation techniques as taught in United States Letters Patent No. 2,911,380. The processes described therein normally result in a varying frequency of halomethylation with respect to a particular diphenyl ether molecule, which frequently generally ranges from about 1 to about 4 halomethyl groups per diphenyl ether nucleus. It is, therefore, most expedient to employ the variably halomethylated reaction product as the starting material for the invention. It is necessary however, that the halomethylation reaction be carried out to an extent sufficient to provide a product having an average of from 1.5 up to 2.5 halomethyl groups per diphenyl ether nucleus. However, it should be understood that while mixtures of halomethylated diphenyl ethers are conveniently employed in the invention, that individual halomethylated derivatives containing two halomethyl groups per diphenyl ether nucleus are also operable in the invention. It has been observed, however, that halomethylated diphenyl ethers having an average of less than 1.5 halomethyl groups per molecule produce undesirable short-chain, low molecular weight reaction products, whereas halomethylated diphenyl ethers having an average of more than 2.5 halomethyl groups per molecule produce cross-linked network type polymers.

As previously indicated any secondary amine having the formula:

wherein each R is individually selected from the group consisting of phenyl, alkyl radicals having from 1 to 10 carbon atoms, hydroxyalkyl radicals having from 2 to 6 carbon atoms and cyclic alkyls having from 5 to 6 carbon atoms and wherein R and R when taken together form with the nitrogen atom a ring containing 4 to 5 carbon atoms, may be used in the present process. Preferably, the radicals joining the nitrogens contain not more than about six carbon atoms each since extent and speed of polymer formation are favored by low molecular weight radicals. Preferably, the amine is wholly saturated since saturation favors stability of the resulting product. Specific amines which are suitable include, but are not restricted to: dimethylamine, diethylamine, di-n-propylamine, di-butylamine, diethanolamine, dicyclohexylamine, N-methylaniline, and piperidine.

Suitable ditertiary amines are those having the formula:

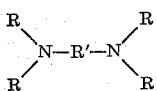

wherein each R is as previously described and wherein R' is a bivalent organic radical selected from the group consisting of polymethylene and phenylene, which radical may be substituted or not by groups which do not interfere with the polymer-forming reaction, such as ether, sulfide, ketone, nitro, amide, hydroxyl, thiol, and the like. Preferably, the radicals other than that joining the nitrogens contain not more than about six carbon atoms each since extent and speed of polymer formation are favored by low moleclular weight radicals. Additionally, it is preferred that the diamine is wholly saturated since saturation favors stability of the product. In general, the saturated N,N,N',N'-tetraalkylpolymethylenediamines in which each of the four alkyl groups has not more than six carbons will give best results from all points of view. Specific amines which are suitable include but are not restricted to the following: N,N,N',N'-tetraethyl-1,4-cyclohexylenediamine, 1,6-bis(dimethylamino)2,5-dimethylhexane, N,N,N',N'-tetraethyl-1,6-diamino-3-hexane, N-allyl - N,N',N' - trimethyloctadecamethylenediamine, triethylenediamine, 1,4-dimethylpiperazine, 4,4'-oxybis-(benzlydimethylamine) and many others.

The above reaction products may be readily prepared by slowly contacting essentially chemically equivalent amounts of at least one halomethylated diphenyl ether and secondary or ditertiary amines as defined above, in water or other suitable polar liquid compound which is inert to the reactants and capable of dissolving or dispersing the reactants and being maintained at the temperature of the reaction. The reactants are suitably contacted at a temperature from about 20° C. to about 100° C. The contact time of the reaction constituents is dependent upon the reactivity of such constituents and the reaction temperature employed. Thus, such reaction time may range from several minutes to a period of several hours.

In carrying out the reaction, it is important that reaction stoichiometry be maintained very close to 1:1, otherwise only small amounts of polymer beyond very low molecular weight material is formed. Preferred molar ratios are in the range of from about 0.9:1 to about 1:1.1.

Although the reaction is exothermic, control of the reaction temperature may be achieved by the rate of the addition of reactants and the amount of heating or cooling applied to the reaction mixture. When water is used it is often advantageous to introduce small quantities of a non-ionic emulsifying agent therein for the purpose of increased contact of the reactants. Agitation is normally employed to insure efficient contact of the reactants.

Upon completion of initial reaction, the mixture is desirably treated with an alkaline material such as sodium and potassium carbonates and hydroxides or the like to react with the acid by-product formed, thus liberating remaining amines to allow completion of polymerization. Thereafter the reaction mixture is subjected to filtering and/or decantation to effect removal of low molecular weight polymers and the product recovered by drying the reaction mass under vacuum. The resulting product is rendered plastic or flowable, by heating at temperatures above its softening point and below the decomposition point of the mixture, and formed or shaped by molding said product by usual injection or compression molding operations to form thermoplastic heat-resistant articles having electro-conductive properties.

It has been observed that chain length and structure of the thermoplastic reaction products of this invention may be substantially controlled by the introduction of related comonomers, i.e., small amounts of a tertiary amine such as trimethylamine, will cap the polymer chains and prevent formation of significant amounts of high molecular weight polymer. Correspondingly, the same effect may be attained by introduction of small amounts of monofunctional halogenated compounds, i.e., benzyl chloride. Branched or cross-linked structures may be attained by introduction of primary amines, i.e., methylamines, or, preferably, small amounts of a suitable tri-functional halogenated compound, such as 1,3,5-tris-(chloromethyl)benzene.

The following examples further illustrate the invention but are not to be construed as limiting its scope.

*Example 1*

A quantity of 1 gram-mole of 4,4'-bis(chloromethylphenyl) ether was triturated and intimately admixed with 500 milliliters of isopropyl alcohol in a three-liter reaction flask containing a reflux condenser and a sparging tube. To the mixture was added 0.975 gram-mole of dimethylamine as a 25 percent aqueous solution and the admixture subsequently stirred for a period of 24 hours at a temperature between 40° and 44° C. A quantity of 1 gram-mole of dipotassium phosphate was then added to the admixture and a stream of argon saturated with wet dimethylamine passed slowly through the system. The admixture was then reacted for a period of about 4 days, after which the reaction product was cooled in ice and the supernatant liquid decanted. The polymeric residue was thoroughly washed with water, dissolved in methanol, filtered to remove mechanical impurities, reprecipitated by addition of isopropyl alcohol and the polymeric product obtained by drying such precipitate, grinding the same in a Wiley Mill and redrying the ground polymeric product under vacuum at 160° C. for a period of about 48 hours. The resulting polymeric powder having a melting point of 162° C. as determined on a Fisher-Jones melting point apparatus, was subsequently compression molded at 150° C. under 40,000 p.s.i. to form a clear, brittle plastic having unusual electrical properties. In this regard, the resistivity of an 80 mils thick compression molding of such polymer was found to be $1.6 \times 10^4$ ohm-centimeters.

*Example 2*

A quantity of 1 gram-mole of 4,4'-bis(chloromethylphenyl) ether in 1000 milliliters of methanol was combined with 1 gram-mole of dimethylamine hydrochloride contained in 500 milliliters of methanol, in a three-liter reaction flask. To the mixture was added 1.5 gram-moles of dipotassium phosphate in 500 milliliters of water and 150 grams (0.83 gram-equivalent) of a weak-base ion-exchange resin in the free base form. After stirring the mixture for 110 hours at room temperature, the contents were poured into ice water and allowed to stand overnight. The supernatant liquid was decanted and redissolved in a 1:1 methanol-water solution, reprecipitated with excess water, then redissolved in wet methanol and reprecipitated in eight volumes of isopropyl alcohol. On drying, an off-white, solid, moldable polymeric product was obtained.

*Example 3*

A quantity of 200 milliliters of a 1 molar solution of 4,4'-bis(bromomethylphenyl) ether in dioxane was intimately admixed with 35 grams of dimethylamine as a 25 percent aqueous solution, in a one-liter reaction flask. To the mixture was added 100 milliliters of a 2 molar solution of dipotassium phosphate and the so-formed mixture agitated for seven days at room temperature. The resulting polymeric residue was filtered, and an off-white moldable brittle polymer obtained which was soluble in methanol, and insoluble in water, dioxane, isopropanol and dimethylformamide.

*Example 4*

A quantity of 0.1 gram-mole of 4,4'-bis(chloromethylphenyl) ether was combined with 0.1 gram-mole of N,N,N',N'-tetramethylethylenediamine in 250 milliliters of a 3:1 methanol-water solution and the mixture gently shaken at room temperature for a period of two weeks. The resulting polymeric phase was separated, dissolved in wet methanol, precipitated with 1,4-dioxane, and dried under vacuum at 60° C. for a period of 48 hours yielding a white, moldable water-soluble polymeric product having a melting point of 179° C. to 182° C.

*Example 5*

A quantity of 0.1 gram-mole of 4,4'-bis(chloromethylphenyl)ether was combined with 0.1 gram-mole of tri-ethylene diamine by procedures as described in Example 4, and the resulting polymeric phase separated, dissolved in wet methanol, precipitated by addition of an organic solvent mixture consisting of 2 parts dioxane, 2 parts toluene, 1 part isopropyl alcohol, and collected and dried under vacuum at 60° C. for a period of 48 hours. A white, moldable polymer product having a melting point of 228° to 232° C. was thereby obtained.

*Example 6*

A quantity of 0.1 gram-mole of 4,4'-bis(chloromethylphenyl)ether was combined with 0.1 gram-mole of 1,4-dimethylpiperazine and the product purified as described by the procedures of Example 5. A white, moldable polymer product having a melting point of 194° to 197° C. was obtained.

Similar thermoplastic polymeric condensation products having unusual and desirable electrical properties can be obtained by quaternization of at least one of the halomethylated diphenyl ethers described herein with chemically equivalent amounts of a secondary or dietertiary amine of the present invention, utilizing the reaction procedures as described herein. Such polymeric materials are particularly useful for preparing articles such as films and the like having antistatic and ion-exchange properties.

What is claimed is:

1. A thermoplastic substantially linear condensation polymer obtained by the reaction in an inert polar solvent and at a temperature between about 20° C. and 100° C. of chemically equivalent amounts of (1) a halomethylated diphenyl ether containing not more than 4 halomethyl radicals selected from the group consisting of chloromethyl and bromomethyl radicals, said diphenyl ether having an average of from 1.5 up to 2.5 halomethyl groups per diphenyl ether nucleus, and (2) an amine selected from the group consisting of (a) secondary amines having the formula:

and (b) ditertiary amines having the formula:

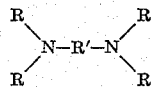

wherein each R is individually selected from the group consisting of phenyl, alkyl radicals having from 1 to 10 carbon atoms, hydroxyalkyl radicals having from 2 to 6 carbon atoms and cycloalkyl radicals having from 5 to 6 carbon atoms, and wherein R and R taken together with the nitrogen atom form a ring containing 4 to 5 carbon atoms, and R' is a bivalent organic hydrocarbon radical selected from the group consisting of polymethylene and phenylene.

2. A thermoplastic substantially linear condensation polymer as claimed in claim 1, wherein said halomethyl diphenyl ether is 4,4'-bis(chloromethylphenyl)ether.

3. The thermoplastic substantially linear condensation polymer claimed in claim 1, wherein said halomethyl diphenyl ether is 4,4'-bis(bromomethylphenyl)ether.

4. A thermoplastic substantially linear condensation polymer as claimed in claim 1, wherein said amine is dimethylamine.

5. A thermoplastic substantially linear condensation polymer as claimed in claim 1, wherein said amine is dimethylamine hydrochloride.

6. A thermoplastic substantially linear condensation polymer as claimed in claim 1, wherein said amine is N,N,N',N',-tetramethylethylenediamine.

7. A thermoplastic substantially linear condensation polymer as claimed in claim 1, wherein said amine is triethylenediamine.

8. A thermoplastic substantially linear condensation polymer as claimed in claim 1, wherein said amine is 1,4-dimethylpiperazine.

9. A process for the preparation of polymeric, moldable substantially linear condensation polymers comprising the reaction in an inert polar solvent and at a temperature between about 20° C. and 100° C. of chemically equivalent amounts of (1) a halomethylated diphenyl ether containing not more than 4 halomethyl radicals selected from the group consisting of chloromethyl and bromomethyl radicals, said diphenyl ether having an average of from 1.5 up to 2.5 halomethyl groups per diphenyl ether nucleus, and (2) an amine selected from the group consisting of (a) secondary amines having the formula:

and (b) ditertiary amines having the formula:

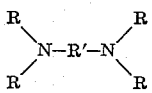

wherein each R is individually selected from the group consisting of phenyl, alkyl radicals having from 1 to 10 carbon atoms, hydroxyalkyl radicals having from 2 to 6 carbon atoms and cycloalkyl radicals having from 5 to 6 carbon atoms, and wherein R and R taken together with the nitrogen atom form a ring containing 4 to 5 carbon atoms, and R' is a bivalent organic hydrocarbon radical selected from the group consisting of polymethylene and phenylene.

10. The process as claimed in claim 9, wherein said halomethyl diphenyl ether is 4,4'-bis(chloromethylphenyl)ether.

11. The process as claimed in claim 9, wherein said halomethyl diphenyl ether is 4,4'-bis(bromomethylphenyl)ether.

12. The process as claimed in claim 9, wherein said amine is dimethylamine.

13. The process as claimed in claim 9, wherein said amine is dimethylamine hydrochloride.

14. The process as claimed in claim 9, wherein said amine is N,N,N',N'-tetramethylethylenediamine.

15. The process as claimed in claim 9, wherein said amine is triethylenediamine.

16. The process as claimed in claim 9, wherein said amine is 1,4-dimethylpiperazine.

No references cited.

WILLIAM H. SHORT, *Primary Examiner.*
C. A. WENDEL, *Assistant Examiner.*